(No Model.) 2 Sheets—Sheet 1.
C. E. LAWRENCE.
HAND LEVEL.
No. 396,883. Patented Jan. 29, 1889.
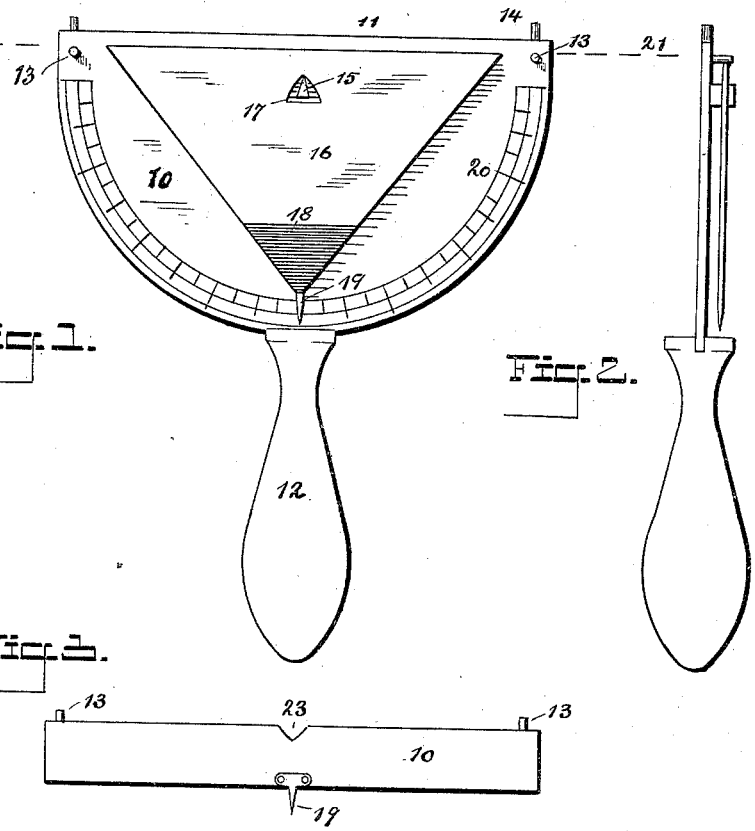
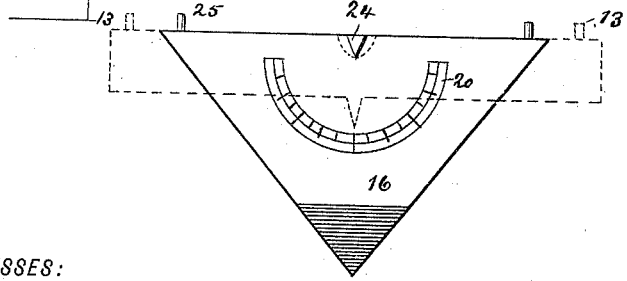
WITNESSES:
C. Sedgwick
J. M. Ritter
INVENTOR,
C. E. Lawrence
BY Munn & Co
ATTORNEYS (No Model.) 2 Sheets—Sheet 2.

C. E. LAWRENCE.
HAND LEVEL.

No. 396,883. Patented Jan. 29, 1889.

WITNESSES:
C. Sedgwick
J. M. Ritter

INVENTOR,
C. E. Lawrence
BY Munn & Co
ATTORNEYS

United States Patent Office.

CHARLES E. LAWRENCE, OF NEW BRIGHTON, NEW YORK.

HAND-LEVEL.

SPECIFICATION forming part of Letters Patent No. 396,883, dated January 29, 1889.

Application filed April 19, 1888. Serial No. 271,163. (No model.)

*To all whom it may concern:*

Be it known that I, CHARLES EDWARD LAWRENCE, of New Brighton, in the county of Richmond and State of New York, have invented a new and useful Improvement in Hand-Levels, of which the following is a full, clear, and exact description.

My invention relates to an improvement in hand-levels, and has for its object to provide a device also adaptable to other uses for which levels are designed, which shall indicate to the eye while held in position opposite it the slightest deviation from the horizontal plane in the instrument itself, as well as any elevation above or depression below the plane of observation in the object observed. It is also designed to be a simple instrument to be carried in the hand or pocket, which shall answer the purpose for rough estimates of more complicated instruments for the survey of lands and other surfaces, and which, moreover, shall fulfill all other purposes of a spirit-level, for which its form permits, while dispensing with the necessity of liquid or glass.

The invention consists of two essential parts, separable and distinct, which may, however, be united in any application by a permanent pivot or by springs or other devices to limit the range of movement, while admitting full play of one upon the other, or by any other approved practicable means. These two parts of the invention above referred to are, first, a supporting portion or body to be held in the hand or placed upon, against, or under any object, and, second, a pendant supported on the body by means of a pivot, a point, a sharp edge, or other suitable contrivance.

The several parts may be made of any material or materials and in any shape or shapes, and the several subsidiary devices shown in the accompanying drawings, as well as others which may serve similar ends, may be attached to one or other of the two parts of the invention or may be connected with the device in any manner answering similar ends; also, the number of pins or sights, the position of the weights, the shape and position of the handle and other attachments, and the position of the scales, pointers, &c., may be changed to suit different forms or uses of the level.

Reference is to be had to the accompanying drawings, forming a part of this specification, in which similar figures of reference indicate corresponding parts in all the views.

Figure 7:
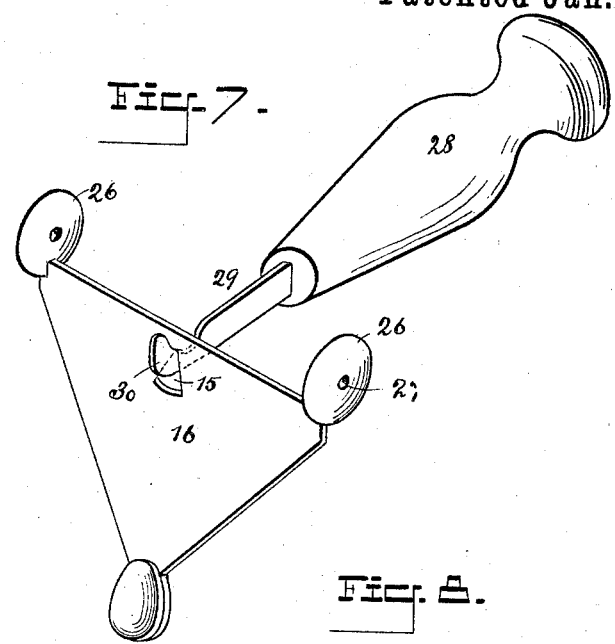
Figure 8:
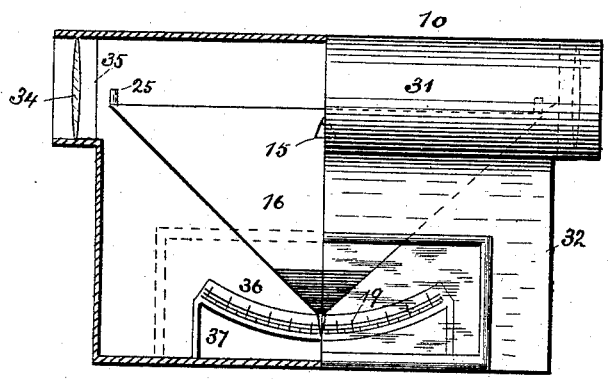
Figure 9:
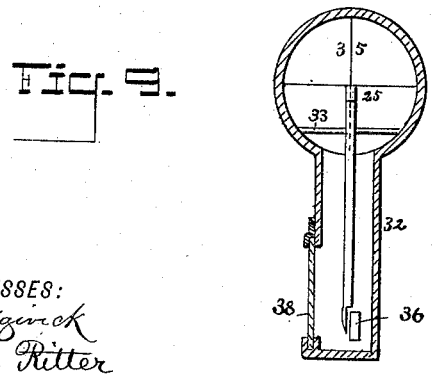

Figure 1 is a side elevation of one form of the level. Fig. 2 is a front elevation or edge view of the same. Fig. 3 is a side elevation of the body of another form of level. Fig. 4 is a plan view of the same. Fig. 5 is a side elevation of the pendant, illustrating its application to the body, in dotted lines. Fig. 6 is a plan view of the pendant. Fig. 7 is a perspective view of another modified form of the level, illustrating the pendant as supported by the body. Fig. 8 is a side elevation, partly in section, of a further modification, illustrating the pendant in position within the body and the said pendant incased by said body; and Fig. 9 is a central vertical section of Fig. 8.

In carrying out the invention, I shall first describe the construction illustrated in Fig. 1. The body 10 is preferably segmental in contour, provided with a straight upper surface, 11, and a handle, 12, attached to the lower circular edge. The body 10 is further provided upon one side, at or near the upper end, with aligning sight-pins 13, one pin being located near each edge extending outward from the body at right angles thereto.

Upon the upper straight edge, 11, of the body, near each end, horizontal aligning vertical sight-pins 14 are usually attached, and upon a line drawn through the center of the body, from top to bottom, near the upper edge, 11, a pivot, 15, is secured or formed integral therewith, which pivot-pin is provided with an upper knife-edge that extends horizontally outward from said body.

In connection with the body 10 I use a pendant, 16, which pendant I prefer to make in the shape of a triangle with the base uppermost. Upon the central vertical line drawn through the apex of the triangle and at a point near the base-line an angular recess or slot, 17, is cut, whereby the pendant is suspended from the pivot-pin 15, as illustrated in Fig. 1.

The pendant is weighted at the apex, as shown at 18, and provided with an attached pointer, 19, which pointer is adapted to travel over the scale 20, produced upon the body 10 near the outer edge. The pointer and scale are adapted to indicate the deviation of the base-line of the pendant from a horizontal position or the apex of the same from a vertical line. The pointer and scale are also useful in verifying the accuracy of the entire instrument whenever this may be questioned. I desire it distinctly understood, however, that I do not limit myself to the adaptation of the pointer and the scale in either this form of device or any other form that may be hereinafter described, as the device or devices are operative without such attachments. In using this form of level the handle 12 is grasped by the hand and the eye applied at the dotted line 21. The body is now manipulated until the pins 13 are brought in alignment and the entire upper base-line of the pendant is visible when so viewed.

In the form of device illustrated, respectively, in Figs. 3, 4, 5, and 6 the body 10 is more or less rectangular and provided with a central slot, 22, extending through from side to side. The pointer 19 in this instance is applied to one side of the body, to project downward below the under edge, as best shown in Fig. 3, and the bearing-surface for the pendant 16 is produced in the upper edges of the body immediately over the pointer 19, the same consisting of V-shaped recesses 23.

The pendant is provided at or near the base-line with a knife-edge pivot-pin, 24, one pin projecting from each side, said pins being adapted, when the pendant is passed downward through the slot 22 of the body, to be brought in engagement with the lower wall of the recesses 23, as illustrated in dotted lines in Fig. 5. The scale 20 in this instance is produced upon the pendant, and the sights consist of aligning-pins 13, secured upon the upper end surfaces of the body, and intermediate sight-pins, 25, attached to the base-line of the pendant at or near the ends. In using this form of instrument the body is manipulated until the several pins 13 and 25 are brought in positive alignment.

In the form of level illustrated in Fig. 7 the pendant 16 is essentially the same as that illustrated in Fig. 1, being provided with a V-shaped slot, 15. At each end of the base-line of said pendant a disk, 26, is attached, each disk being provided with a central aperture, 27, which apertures are so located in the disks that they will horizontally align one another. The support for the pendant consists of a handle, 28, having secured in one end a blade, 29, provided upon the upper edge and near the extremity with a V-shaped slot or recess, 30. In using this form of level the blade 29 is passed through the slot 15 of the plate until the upper wall of the slot in the pendant and the lower wall of the slot in the blade 29 are brought in engagement. The disks 26 are then brought up on a level with the eye and the body manipulated until the apertures are brought in proper alignment.

The body 10, of that form of invention illustrated in Figs. 8 and 9, consists of a casing having an upper tubular portion, 31, and a lower essentially-rectangular body portion, 32. The tubular section 31 is preferably made to project a distance beyond the ends of the rectangular section 32, as illustrated in Fig. 8. Transversely of the tubular section 31 and centrally within the same a rod or pin, 33, is secured, which rod or pin is adapted to pass through the V-shaped recess 15 of the pendant 16, the said pendant having been entered into the casing through a suitable slot at one end.

The pendant 16 is provided in this case, as in Fig. 1, with a pointer, 19, secured at the apex, and is also provided, as illustrated in Fig. 5, with vertical sight-pins 25 upon the base at or near each end.

In the ends of the tubular section 31 a glass, 34, is located, which may be covered, when not in use, by means of a suitable cap or protected in any other approved manner. To the rear of the glasses 34 cross-hairs 35 are provided.

In the bottom of the rectangular or body section 32 of the casing 10 a segmental plate, 36, is longitudinally supported by means of end standards, 37, over which plate, which has a scale-surface, the pointer 19 is adapted to travel. This scale is rendered visible by cutting away a portion of the side of the body-casing and inserting therein in any suitable or approved manner a glass pane, 38, as best shown in Fig. 9. In using this form of level the point of intersection of the cross-hairs is brought in alingment with the upper ends of the several sight-pins 25, attached to the pendant. The casing is designed to protect the instrument from wind, rain, snow, &c., and thereby insure the greatest accuracy. These additions or any other for the same or similar purposes may be used together or separately or in any combination.

If it be found desirable, the glass at the end of the tubular section of the casing may be omitted and the operative portions of the instrument be made extremely delicate, and compensating metals or other devices may be utilized to insure perpetual accuracy.

Having thus described my invention, what I claim as new, and desire to secure by Letters Patent, is—

1. The combination, with a supporting-body having horizontally-alinged sighting devices, of a counterbalanced pendant pivotally connected at its vertical center to the said support between its sighting devices, the extreme upper surface or edge of the pendant at both sides of the pivotal point being in line with the sights on the body when they are in a true horizontal plane, but interrupting or crossing the line of vision between the sights when the latter are not in such a plane, substantially as set forth.

2. The combination, with the supporting-body having opposite aligned sighting devices, and a segmental scale below the same, of a triangular pendant pivoted to the support on a central vertical line having its base uppermost and in the plane of the sighting devices when they are on a true horizontal line, and provided at its vertex with a pointer, substantially as set forth.

3. The combination, with the open-ended tube provided with aligned sighting devices in its ends, of the counterbalanced pendant pivoted between the said sighting devices, with its extreme upper surface or edge at opposite sides of its pivotal point in line with said sights when they are in a true horizontal plane, substantially as set forth.

4. The combination, with the casing 32, having the graduated segment 36 and glazed aperture therefor, and the tube 31, having lenses and crossed sight-wires in its ends, of the triangular pendant 16, pivoted on a vertical central line near its base in the tube, and having pins 25 in line with the points of intersection of said wires when they are in a true horizontal plane, the vertex of said triangle having a pointer registering with the segment, substantially as set forth.

CHARLES E. LAWRENCE.

Witnesses:
BENJ. NORTHROP,
MAYBURY FLEMING.